US006258757B1

(12) United States Patent
Sweatman et al.

(10) Patent No.: US 6,258,757 B1
(45) Date of Patent: *Jul. 10, 2001

(54) WATER BASED COMPOSITIONS FOR SEALING SUBTERRANEAN ZONES AND METHODS

(75) Inventors: Ronald E. Sweatman, Montgomery; Archie J. Felio, League City; James F. Heathman, Houston, all of TX (US)

(73) Assignee: Halliburton Energy Services, Inc., Duncan, OK (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/818,326

(22) Filed: Mar. 14, 1997

(51) Int. Cl.$^7$ ............................................. C09K 3/00
(52) U.S. Cl. ...................................... 507/219; 507/221
(58) Field of Search ................................. 507/221, 219

(56) References Cited

U.S. PATENT DOCUMENTS

| | | | |
|---|---|---|---|
| 2,637,692 | 5/1953 | Nahin | 252/8.5 |
| 2,675,353 | 4/1954 | Dawson | 252/8.5 |
| 2,960,465 | 11/1960 | Brink | 252/8.5 |
| 3,082,823 | 3/1963 | Hower | 166/29 |
| 3,467,208 | 9/1969 | Kelly, Jr. | 175/72 |
| 3,724,564 | 4/1973 | Messenger | 175/72 |
| 3,724,565 | 4/1973 | Kelly, Jr. | 175/72 |
| 3,730,271 | 5/1973 | Gall | 166/294 |
| 3,812,937 | 5/1974 | Abbott et al. | 188/266 |
| 4,173,999 | 11/1979 | Messenger | 166/293 |
| 4,360,120 * | 11/1982 | Samuel et al. | 524/494 |
| 4,368,828 * | 1/1983 | Samuel et al. | 524/494 |
| 4,383,054 * | 5/1983 | Schulze et al. | 523/131 |
| 4,397,354 | 8/1983 | Dawson et al. | 166/294 |
| 4,439,328 * | 3/1984 | Moity | 507/104 |
| 4,442,241 | 4/1984 | Drake et al. | 523/130 |
| 4,503,170 | 3/1985 | Drake et al. | 523/130 |
| 4,566,977 | 1/1986 | Hatfield | 252/8.5 C |
| 4,633,950 | 1/1987 | Delhommer et al. | 166/295 |
| 4,643,255 | 2/1987 | Sandiford et al. | 166/295 |
| 4,740,319 * | 4/1988 | Patel et al. | 507/118 |
| 4,753,974 | 6/1988 | Goodman et al. | 524/447 |
| 4,836,940 * | 6/1989 | Alexander | 507/119 |
| 5,151,131 | 9/1992 | Burkhalter et al. | 106/822 |
| 5,258,072 | 11/1993 | Gopalkirshnan et al. | 106/802 |
| 5,306,739 * | 4/1994 | Lucey | 522/42 |
| 5,372,641 * | 12/1994 | Carpenter et al. | 106/714 |
| 5,447,197 * | 9/1995 | Rae et al. | 166/293 |
| 5,458,195 * | 10/1995 | Toten et al. | 166/293 |
| 5,476,142 | 12/1995 | Kajita | 166/294 |
| 5,547,506 * | 8/1996 | Rae et al. | 106/730 |
| 5,569,324 * | 10/1996 | Totten et al. | 106/696 |
| 5,588,488 * | 12/1996 | Vijn et al. | 166/293 |
| 5,629,270 | 5/1997 | Van Slyke | 507/125 |
| 5,663,123 * | 9/1997 | Goodhue et al. | 507/225 |
| 5,669,456 | 9/1997 | Audibert et al. | 175/72 |
| 5,688,844 | 11/1997 | Chatterji et al. | 524/8 |
| 5,738,463 | 4/1998 | Onan | 405/154 |
| 5,795,924 | 8/1998 | Chatterji et al. | 523/130 |
| 5,820,670 | 10/1998 | Chatterji et al. | 106/727 |
| 5,913,364 | 6/1999 | Sweatman | 116/281 |
| 6,060,434 | 5/2000 | Sweatman et al. | 507/216 |

FOREIGN PATENT DOCUMENTS

| | | | | |
|---|---|---|---|---|
| 31 35 892 | 9/1980 | (DE) | | C08L/1/26 |
| 0 280 341 | 1/1988 | (EP) | | E21B/43/26 |
| 2701733 | 8/1994 | (FR) | | E21B/43/32 |
| 2 108 175 | 11/1981 | (GB) | | C09K/7/06 |
| 2108175 | 5/1983 | (GB) | | C09K/7/06 |
| WO 81/00874 | 4/1981 | (WO) | | E21B/21/12 |
| WO 96/00762 | 1/1996 | (WO) | | C09K/7/06 |

OTHER PUBLICATIONS

Abstract No. XP–002069564, The American Petroleum Institute, New York.
Abstract No. XP–002069604, Derwent Publications, Ltd, London, GB.
Abstract No. XP–002069565, Derwent Publications, Ltd., London, GB.
Abstract No. XP–002069606, Derwent Publications, Ltd., London, GB.
Abstract No. XP–002069605, Derwent Publications, Ltd., London, GB.
Carl R. Noller; Textbook of Organic Chemistry, pp. 505–515, 1960.
Abstract No. XP–0020698058, Derwent Publications, Ltd., London, GB, 1987.

* cited by examiner

*Primary Examiner*—C. H. Kelly
(74) *Attorney, Agent, or Firm*—Craig W. Roddy; C. Clark Dougherty, Jr.

(57) ABSTRACT

The present invention provides water based compositions and methods of using the compositions for sealing subterranean zones. The compositions are basically comprised of water, an aqueous rubber latex, an organophillic clay and sodium carbonate.

27 Claims, No Drawings

WATER BASED COMPOSITIONS FOR SEALING SUBTERRANEAN ZONES AND METHODS

BACKGROUND OF THE INVENTION

1. Field of the Invention

The present invention relates to improved water based compositions for sealing subterranean zones and methods of utilizing the compositions.

2. Description of the Prior Art

In the drilling, of oil and gas wells using the rotary drilling method, drilling fluid is circulated through the drill string and drill bit and then back to the surface by way of the well bore being drilled. The drilling fluid maintains hydrostatic pressure on the subterranean zones through which the well bore is drilled and circulates cuttings out of the well bore. During such drilling, subterranean vugs, fractures and other thief zones are often encountered whereby the drilling fluid circulation is lost and drilling operations must be terminated while remedial steps are taken. Also, when a subterranean zone is penetrated containing fluids under pressure which exceeds the hydrostatic pressure exerted on the zone by the drilling fluid, formation fluid crossflows and/or underground blow-outs can and often do occur.

Heretofore, a variety of compositions have been developed and used for combatting lost circulation, crossflow and underground blow-out problems. However, such compositions have often been unsuccessful due to delayed and inadequate viscosity development by the compositions. For example, a variety of compositions containing hydraulic cement or the like have been used in attempts to stop lost circulation. The lost circulation is usually the result of encountering weak subterranean zones that contain natural fractures or are fractured by drilling fluid pressures and rapidly break down. When a cement or other slow setting composition is squeezed into the zone, the delay in developing high viscosity allows the cement composition to be diluted and displaced into the zone whereby it bypasses the fractures and vugs causing the lost circulation. The same type of problem often occurs when crosslinked hydrated gels and other similar plugging compositions are utilized.

Thus, there is a need for improved compositions and methods for sealing subterranean zones that develop ultra high viscosity in a few seconds or minutes instead of the longer times heretofore required for sealing compositions to reach plugging viscosity.

SUMMARY OF THE INVENTION

Improved water based compositions for sealing subterranean zones and methods of using the compositions are provided which overcome the deficiencies of the prior art and meet the needs described above. The compositions and methods are particularly suitable for sealing subterranean zones containing oil based drilling fluids, e.g., water in oil emulsions, known as inverted emulsions. The compositions are basically comprised of water, an aqueous rubber latex, an organophillic clay and sodium carbonate. The compositions can also include one or more latex stabilizers, dispersing agents, biopolymers, defoaming agents, foaming agents, emulsion breakers, fillers, rubber vulcanizing agents and the like.

When the sealing compositions of this invention contact oil and water containing divalent cations in the well bore, the rubber latex is destabilized by the divalent cation in the water whereby the rubber is precipitated and the organophillic clays simultaneously react with the oil to instantly form an ultra high viscosity rubbery mass.

The methods of the invention comprise the steps of preparing a sealing composition of this invention and then introducing it into the subterranean zone to be sealed.

It is, therefore, a general object of the present invention to provide improved water based compositions for sealing subterranean zones and methods.

Other and further objects, features and advantages of the present invention will be readily apparent to those skilled in the art upon a reading of the description of preferred embodiments which follows.

DESCRIPTION OF PREFERRED EMBODIMENTS

As mentioned above, in the drilling of wells, subterranean zones are often encountered which contain high incidences of natural vugs and fractures. As a result, drilling fluid circulation is often lost which requires the termination of the drilling and the implementation of remedial procedures which are often of long duration and high cost. Such remedial procedures have heretofore involved the placement of hardenable compositions such as Portland cement compositions or crosslinked stiff gels and the like in the lost circulation zone. However, as mentioned above, because such compositions require considerable time to harden or gel, successful plugging of the zone often does not take place. In addition to drilling fluid lost circulation zones, zones containing pressurized fluids can be encountered which cause gas, oil or water crossflows that dilute and wash away sealing compositions. Also, underground blow-outs at low to high formation fluid flow rates can take place.

The present invention provides improved compositions for sealing subterranean zones and terminating the loss of drilling fluid, crossflows and/or underground blow-outs. The compositions are particularly suitable for use in wells containing oil based drilling fluids, e.g., water in oil emulsions and the like. When a composition of this invention contacts an oil based drilling fluid it instantly forms a resilient rubbery mass having ultra high viscosity. As the sealing mass is displaced through the well bore, it enters and seals thief zones such as vugs and fractures through which fluid is lost. A flexible seal is obtained by a combination of extrusion pressure and friction pressure. The sealing compositions are self diverting and plug multiple weak zones in a single well treatment. When a well contains a crossflow or underground blow-out, the high viscosity sealing compositions plug all the lower pressure weak zones penetrated by the well bore and as the pressure in the well bore is increased, the crossflow or blow-out zone is plugged. The resultant sealed well bore achieved by the sealing compositions of this invention can hold higher drill-ahead drilling fluid weights and produce a wedging effect in plugged fractures that increases the integrity of the entire formation or zone.

Depending upon the particular type of subterranean zone to be plugged, the high viscosity sealing compositions of this invention can range from a soft rubbery consistency to a semi-hard rubber consistency (vulcanized) and when required, to a very hard consistency (cement or other hardenable material added). The portion of the sealing composition left in the well bore after sealing one or more zones therein remains movable to divert to other zones above or below the sealed zones. The rubbery mass is not diluted or washed away by crossflows as are most prior art compositions.

The sealing compositions of the present invention are basically comprised of water, an aqueous rubber latex, an organophillic clay and sodium carbonate. The aqueous rubber latex present in the compositions of this invention is caused to destabilize by water in the well bore containing electrolyte such as calcium chloride whereby the rubber is precipitated. The organophillic clay simultaneously reacts with oil in the well bore to form a high viscosity rubbery sealing mass. The sodium carbonate in the compositions functions to stabilize the rubber latex and prevent precipitation when the latex is mixed with water which contains calcium compounds during the preparation of the compositions. Sodium hydroxide can also be added to prevent precipitation if the water used to form the compositions contains magnesium or other latex destabilizing compounds.

The water in the sealing compositions which is in addition to the water contained in the aqueous latex, is included in the compositions to make the compositions pumpable. The water can be from any source provided it does not contain the above mentioned compounds that adversely affect the rubber latex or other components in the compositions. However, fresh water is preferred. Generally, the additional water is present in an amount in the range of from about 6% to about 50% by weight of the compositions, more preferably in a range of from about 30% to about 42%.

A variety of well known rubber materials can be utilized in accordance with the present invention. Such materials are commercially available in aqueous latex form, i.e., aqueous dispersions or emulsions. For example, natural rubber (cis-1,4-polyisoprene) and most of its modified types can be utilized. Synthetic polymers of various types can also be used including styrene/butadiene rubber, cis-1,4-polybutadiene rubber and blends thereof with natural rubber or styrene/butadiene rubber, high styrene resin, butyl rubber, ethylene/propylene rubbers, neoprene rubber, nitrile rubber, cis-1,4-polyisoprenerubber, silicone rubber, chlorosulfonated rubber, polyethylene rubber, epichlorohydrin rubber, fluorocarbon rubber, fluorosilicone rubber, polyurethane rubber, polyacrylic rubber and polysulfide rubber.

Of the various latexes which can be utilized, those prepared by emulsion polymerization processes are preferred. A particularly preferred latex for use in accordance with this invention is a styrene/butadiene copolymer latex emulsion prepared by emulsion polymerization. The aqueous phase of the emulsion is an aqueous colloidal dispersion of the styrene/butadiene copolymer. The latex dispersion usually includes water in an amount in the range of from about 40% to about 70% by weight of the latex, and in addition to the dispersed styrene/butadiene particles, the latex often includes small quantities of an emulsifier, polymerization catalysts, chain modifying agents and the like. The weight ratio of styrene to butadiene in the latex can range from about 10%:90% to about 90%:10%.

It is understood that styrene/butadiene latexes are often commercially produced as terpolymer latexes which include up to about 3% by weight of a third monomer to assist in stabilizing the latex emulsions. The third monomer, when present, generally is anionic in character and includes a carboxylate, sulfate or sulfonate group. Other groups that may be present on the third monomer include phosphates, phosphonates or phenolics. Non-ionic groups which exhibit stearic effects and which contain long ethoxylate or hydrocarbon tails can also be present.

A particularly suitable styrene/butadiene aqueous latex for use in accordance with the present invention has a styrene/butadiene weight ratio of about 25%:75%, and the styrene/butadiene copolymer is suspended in a 50% by weight aqueous emulsion. A latex of this type is available from Halliburton Energy Services of Duncan, Okla. under the trade designation "LATEX 2000™." The aqueous latex used is included in the compositions of this invention in an amount in the range of from about 33% to about 67% by weight of the compositions, more preferably in an amount of from about 39% to about 47%.

In order to prevent the aqueous latex from prematurely coagulating and increasing the viscosities of the sealing compositions of this invention due to contact with coagulation causing compounds in the water used or other source, an effective amount of a latex stabilizing surfactant can optionally be included in the compositions. Latex stabilizing surfactants function to prevent latex coagulation, and those which are particularly suitable for use in accordance with this invention are surfactants having the formula $$R\text{-}Ph\text{-}O(OCH_2CH_2)_mOH$$

wherein R is an alkyl group having from about 5 to about 30 carbon atoms, Ph is phenyl and m is an integer in the range of from about 5 to about 50. Additional particularly suitable surfactants have the general formula $$R_1(OR_2)_nSO_3X$$

wherein $R_1$ is selected from the group consisting of alkyl groups having from 1 to about 30 carbon atoms, cycloalkyl groups having 5 or 6 carbon atoms, $C_1$–$C_4$ alkyl substituted cycloalkyl groups, phenyl, alkyl substituted phenyl of the general formula $(R_3)_a$Ph- wherein Ph is phenyl, $R_3$ is an alkyl group having from 1 to about 18 carbon atoms and a is an integer of from 1 to 3, and phenyl-alkyl groups wherein the alkyl groups have from 1 to about 18 carbon atoms and the phenyl-alkyl groups have a total of from about 8 to about 28 carbon atoms. $R_2$ is a substituted ethylene group of the formula —$CH_2CH_2R_4$ wherein $R_4$ is selected from hydrogen, methyl, ethyl or mixtures thereof, n is a number from 0 to about 40 provided that when $R_1$ is phenyl or alkyl substituted phenyl n is at least one, and X is any compatible cation.

A preferred surfactant in the above defined group is ethoxylated nonylphenyl containing in the range of from about 20 to about 30 moles of ethylene oxide. Another preferred surfactant in the group is a sodium salt having the general formula $$R_5\text{-}Ph(OR_6)_oSO_3X$$

wherein $R_5$ is an alkyl group having in the range of from 1 to about 9 carbon atoms, $R_6$ is the group —$CH_2CH_2$—, o is an integer from about 10 to about 20 and X is a compatible cation.

Yet another preferred surfactant in the group is a sodium salt having the formula $$R_7(OR_8)_pSO_3X$$

wherein $R_7$ is an alkyl group having in the range of from about 5 to about 20 carbon atoms, $R_8$ is the group —$CH_2CH_2$—, p is an integer in the range of from about 10 to about 40 and X is a compatible cation. A particularly preferred surfactant of this type is the sodium salt of a sulfonated compound derived by reacting a $C_{12}$ to $C_{15}$ alcohol with about 15 moles of ethylene oxide having the formula $$H(CH_2)_{12\text{-}15}(CH_2CH_2O)_{15}SO_3Na$$

which is commercially available under the name "AVANEL S150™" from PPG Mazer, Mazer Chemicals, a Division of PPG Industries, Inc., of Gurnee, Ill.

Of the various latex stabilizing surfactants described above which can be used, ethoxylated nonylphenol containing in the range of from about 15 to about 40 moles of ethylene oxide and "AVANEL S150™", i.e., the sodium salt of a sulfonated and ethoxylated compound having the formula $H(CH_2)_{12-15}(CH_2CH_2O)_{15}SO_3Na$ are preferred, with "AVANEL S150™" being the most preferred.

When a latex stabilizing surfactant is included in the sealing compositions of this invention, it is usually added in an amount up to about 35% by weight of the aqueous rubber latex included therein. When the aqueous latex is an aqueous styrene/butadiene latex, the latex stabilizing surfactant utilized is preferably included in the sealing compositions in an amount up to about 25% of the rubber latex included in the compositions.

While a variety of organophillic clays can be utilized, an alkyl quaternary ammonium bentonite clay is preferred. A particularly suitable alkyl quaternary ammonium bentonite clay for use in accordance with this invention is commercially available from Southern Products, Inc. of Gonzales, Tex. under the tradename "CLAYTONE-II™". The organophillic clay is generally present in the compositions of this invention in an amount in the range of from about 13% to about 22% by weight of the compositions, more preferably from about 16% to about 19%.

The sodium carbonate which functions as a buffer and prevents destabilization of the rubber latex due to contact with calcium and the like in the mixing water is generally present in the compositions in an amount in the range of from about 2.7% to about 4.4% by weight of the compositions, more preferably from 3.3% to about 3.7%.

In order to facilitate the dispersal of the solid materials, i.e., the clay and sodium carbonate in the water and aqueous rubber latex, a dispersing surfactant can be included in the compositions. While a variety of dispersing agents can be utilized, preferred dispersing agents are the condensation reaction product of acetone, formaldehyde and sodium sulfite, the condensation reaction product of sodium naphthalene sulfonate and formaldehyde, and sodium-N-methyl-N-oleyltaurine mixed with sulfite liquor. Of these, the condensation reaction product of acetone, formaldehyde and sodium sulfite is most preferred. When used, the dispersing agent is included in the compositions of this invention in an amount in the range of from about 0.35% to about 0.55% by weight of the compositions, more preferably from about 0.4% to about 0.47%.

Another additive which can be utilized is a defoaming agent which prevents foaming during mixing and pumping of the sealing compositions. Because the aqueous rubber latex includes surfactants for emulsifying the latex which also function as foaming agents, a large bubble, unstable foam can be produced when the rubber latex is mixed with water and the other components of the sealing compositions. The defoaming agent can comprise any of the compounds well known for such capabilities such as the polyol silicon compounds. A preferred such defoaming agent is polydimethylsiloxane which is commercially available from Halliburton Energy Services of Duncan, Okla., under the trade designation "D-AIR™3." When used, the defoaming agent is generally included in the sealing compositions in an amount in the range of from about 0.4% to about 1.8% by weight of the compositions, more preferably from about 0.8% to about 1.2%.

Another component which can be included in the sealing compositions is a polymer which hydrates with water and adds viscosity to the composition to help maintain the solid particles therein in suspension without adversely affecting the sealing compositions such as by prematurely destabilizing the rubber latex. The polymer is preferably a biopolymer which is not degraded by microorganisms such as bacteria. A particularly preferred biopolymer for use in accordance with this invention which does not adversely affect the sealing compositions is welan gum. When used, the welan gum is included in the compositions in an amount in the range of from about 0.1% to about 0.2% by weight of the compositions.

A variety of other components can be included in the sealing composition of this invention to provide particular properties required for specific applications. For example, when a relatively hard rubbery sealing composition is required, e.g., when swab or surge pressures may dislodge or bypass the sealing composition, the polymerized rubber can be vulcanized (crosslinked) by including a vulcanizing agent such as sulfur in the composition.

Inert fillers can be included in the sealing compositions to increase the downhole yield of the compositions and/or provide additional hardness to the sealing compositions. Examples of such fillers are silica flour, silica fume, pozzolans and the like. In applications where a well bore is to be plugged and not subsequently drilled out, cement such as Portland cement can be added to the sealing compositions.

Another component which can be added to the sealing compositions is a deemulsifying surfactant which functions to break water in oil emulsion drilling fluids. While such an emulsion breaker is generally not needed in that when a sealing composition of this invention contacts inverted emulsion drilling fluids it functions itself to break the drilling fluid into its oil and water components, some inverted emulsions utilizing synthetic oils are very difficult to break and the presence of a separate deemulsifying agent in the sealing composition is helpful.

The sealing compositions can also be foamed with nitrogen or other suitable gas in the presence of a foaming agent and foam stabilizer for reducing the densities of the compositions, preventing fluid loss and aiding in the diversion of the compositions into zones to be sealed. Suitable foaming agents which can be used are one or more sulfonated linear alcohols or a cocoamidobetaine. A suitable foam stabilizer is comprised of a mixture of methoxypolyethylene glycols. As is well understood by those skilled in the art, a variety of other foaming agents and foam stabilizers can also be used.

A particularly preferred sealing composition of this invention is comprised of water present in an amount in the range of from about 30% to about 42% by weight of said composition, an aqueous 25%:75% by weight styrene/butadiene latex which contains water in an amount of about 50% by weight of the latex present in an amount in the range of from about 39% to about 47% by weight of the composition, a latex stabilizer selected from the group consisting of nonylphenol ethoxylated with in the range of from about 15 to about 40 moles of ethylene oxide and the sodium salt of a sulfonated and ethoxylated compound having the formula $$H(CH_2)_{12-15})CH_2CH_2O)_{15}SO_3Na$$

present in an amount in the range of from about 0% to about 10% by weight of the composition, an alkyl quaternary ammonium bentonite clay present in an amount in the range of from about 16% to about 19% by weight of the composition, sodium carbonate present in an amount in the range of from about 3.3% to about 3.7% by weight of the composition, a dispersing agent comprised of the condensation reaction product of acetone, formaldehyde and sodium sulfite present in an amount in the range of from about 0.4% to about 0.47% by weight of the composition, welan gum biopolymer present in an amount in the range of from about 0.1% to about 0.2% by weight of the composition, and a defoaming agent comprised of polydimethylsiloxane present in an amount in the range of from about 0.8% to about 1.2% by weight of the composition.

The sealing compositions of this invention can be prepared in accordance with any of the well known mixing techniques so long as the latex and latex stabilizing surfactant are not directly admixed without prior dilution by other liquids. In a preferred method, the water used is first introduced into a blender. The defoamer and latex stabilizing surfactant (if used) are then sequentially added with suitable agitation to disperse the constituents. Any other liquid additives are then added followed by the clay, sodium carbonate and other dry solids. The mixture is agitated for a sufficient period of time to mix the components and form a pumpable non-foamed slurry. The aqueous rubber latex used is added last and mixed with the sealing composition just prior to pumping the composition.

The methods of this invention for sealing a subterranean zone to prevent the uncontrolled flow of fluids into or from the zone basically comprise the steps of preparing a subterranean zone sealing composition of this invention comprising water, an aqueous rubber latex, an organophillic clay and sodium carbonate, and then introducing the sealing composition into the zone to be sealed. Generally, the sealing composition is prepared in mixing apparatus at the surface and then pumped down the well bore into the zone to be sealed at a high pressure whereby the rubbery mass formed in the well bore is squeezed into fractures and vugs. A fluid pressure above the fracture gradient can also be used in some applications to fracture the zone being sealed and force the sealing composition into the fractures thereby increasing the overall strength of the zone. As mentioned, the sealing composition enters the weakest portions of the zone first followed by other portions including those where fluids crossflow through the well bore or blow-out into the well bore. The sealing composition stops drilling fluid losses and allows high drilling fluid densities to be utilized when needed while drilling ahead. Once the sealing composition has been placed, it increases the fracture gradient to a higher value that can eliminate the need for intermediate casing, drilling liners and the like. Because the sealing composition readily diverts to other weak zones in the well bore, the integrity of the entire well bore is improved by the sealing composition.

In some applications it may be necessary to pump an activator fluid, e.g., an aqueous calcium chloride solution and/or oil ahead of the sealing composition into the zone to be sealed so that the sealing composition will react to form a rubbery mass prior to being squeezed into the zone.

In order to further illustrate the compositions and methods of the present invention, the following examples are given.

EXAMPLE 1

A water based sealing composition of the present invention comprised of water present in an amount in the range of from about 30% to about 42%, an aqueous styrene/butadiene latex present in an amount in the range of from about 39% to about 47%, an alkyl quaternary ammonium bentonite clay present in an amount in the range of from about 16% to about 19%, sodium carbonate present in an amount in the range of from about 3.3% to about 3.7%, a dispersing agent comprised of the condensation reaction product of acetone, formaldehyde and sodium sulfite present in an amount in the range of from about 0.4% to about 0.47%, welan gum present in an amount in the range of from about 0.1% to about 0.2%, and polydimethylsiloxane defoaming agent present in an amount in the range of from about 0.8% to about 1.2%, all by weight of the composition, was prepared in the laboratory. A portion of the sealing composition was added to an equal portion of a diesel oil based drilling fluid. Within about 20 seconds a solid high viscosity mass was formed which had a moldable consistency.

EXAMPLE 2

In a well being drilled with a non-aqueous drilling fluid, a fractured zone was encountered whereby about 20 barrels per hour of the drilling fluid were being lost. A water based sealing composition as described in Example 1 above was prepared. Equal portions of the composition were pumped down the drill pipe and down the annulus, each at a rate of about one barrel per minute. As the composition reacted with the non-aqueous based drilling fluid in the well bore, high viscosity resilient masses were formed which entered and sealed the fractured zone or zones through which the drilling fluid losses occurred whereupon drilling was resumed.

Thus, the present invention is well adapted to carry out the objects and attain the benefits and advantages mentioned as well as those which are inherent therein. While numerous changes to the compositions and methods can be made by those skilled in the art, such changes are encompassed within the spirit of this invention as defined by the appended claims.

What is claimed is:

1. A composition for sealing a subterranean zone to prevent the uncontrolled flow of fluids into or from the zone consisting essentially of:

water present in an amount in the range of from about 6% to about 50% by weight of said composition;

an aqueous rubber latex present in an amount in the range of from about 33% to about 67% by weight of said composition;

an organophillic clay present in an amount in the range of from about 13% to about 22% by weight of said composition;

sodium carbonate present in an amount in the range of from about 2.7% to about 4.4% by weight of said composition; and a biopolymer present in an amount in the range of from about 0.1% to about 0.2% by weight of said composition.

2. The composition of claim 1 wherein said aqueous rubber latex is an aqueous styrene/butadiene latex.

3. The composition of claim 1 which includes an effective amount of a latex stabilizer selected from the group consisting of surfactants of the formula

$$R\text{-}Ph\text{-}O(OCH_2CH_2)_m OH$$

wherein R is an alkyl group having from about 5 to about 30 carbon atoms, Ph is phenyl and m is an integer in the range of from about 5 to about 50, and surfactants of the general formula

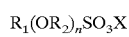

$$R_1(OR_2)_n SO_3 X$$

wherein $R_1$ is selected from the group consisting of alkyl groups having from 1 to about 30 carbon atoms, cycloalkyl groups having 5 or 6 carbon atoms, $C_1$–$C_4$ alkyl substituted cycloalkyl groups, phenyl, alkyl substituted phenyl of the general formula $(R_3)_a Ph$- wherein Ph is phenyl, $R_3$ is an alkyl group having from 1 to about 18 carbon atoms and a is an integer of from 1 to 3, and phenyl-alkyl groups wherein the alkyl groups have from 1 to about 18 carbon atoms and the phenyl-alkyl groups have a total of from about 8 to about 28 carbon atoms, $R_2$ is a substituted ethylene group of the formula $-CH_2CH_2R_4$ wherein $R_4$ is selected from hydrogen, methyl, or ethyl, n is a number from 0 to about 40 provided that when $R_1$ is phenyl or alkyl substituted phenyl n is at least 1 and X is any compatible cation.

4. The composition of claim 1 wherein said organophillic clay is an alkyl quaternary ammonium bentonite clay.

5. The composition of claim 1 which includes a dispersing agent present in an amount in the range of from about 0.35% to about 0.55% by weight of said composition.

6. The composition of claim 5 wherein said dispersing agent is the condensation reaction product of acetone, formaldehyde and sodium sulfite.

7. The composition of claim 1 wherein said biopolymer is welan gum.

8. The composition of claim 1 which includes a defoaming agent present in an amount in the range of from about 0.4% to about 1.8% by weight of said composition.

9. The composition of claim 8 wherein said defoaming agent is comprised of polydimethylsiloxane.

10. The composition of claim 1 which includes one or more components selected from the group of latex stabilizers, dispersing agents, defoaming agents, foaming agents, emulsion breakers, fillers and rubber vulcanizing agents.

11. A composition for sealing a subterranean zone to prevent the uncontrolled flow of fluids into or from the zone consisting essentially of:

water present in an amount in the range of from about 30% to about 42% by weight of said composition;

an aqueous styrene/butadiene latex present in an amount in the range of from about 39% to about 47% by weight of said composition;

an alkyl quaternary ammonium bentonite clay present in an amount in the range of from about 16% to about 19% by weight of said composition;

sodium carbonate present in an amount in the range of from about 3.3% to about 3.7% by weight of said composition; and welan gum present in an amount in the range of from about 0.1% to about 0.2% by weight of said composition.

12. The composition of claim 11 wherein said aqueous styrene/butadiene latex contains water in an amount of about 50% by weight of said latex.

13. The composition of claim 12 wherein the weight ratio of styrene to butadiene in said latex is about 25%:75%.

14. The composition of claim 11 which includes a dispersing agent present in an amount in the range of from about 0.35% to about 0.55% by weight of said composition.

15. The composition of claim 14 wherein said dispersing agent is the condensation reaction product of acetone, formaldehyde and sodium sulfite.

16. The composition of claim 11 which includes a defoaming agent present in an amount in the range of from about 0.4% to about 1.8% by weight of said composition.

17. The composition of claim 16 wherein said defoaming agent is comprised of polydimethylsiloxane.

18. The composition of claim 11 which includes an effective amount of a latex stabilizer selected from the group consisting of surfactants of the formula R-Ph-O(OCH$_2$CH$_2$)$_m$OH wherein R is an alkyl group having from about 5 to about 30 carbon atoms, Ph is phenyl and m is an integer in the range of from about 5 to about 50, and surfactants of the general formula $R_1(OR_2)_nSO_3X$ wherein $R_1$ is selected from the group consisting of alkyl groups having from 1 to about 30 carbon atoms, cycloalkyl groups having 5 or 6 carbon atoms, $C_1$–C4 alkyl substituted cycloalkyl groups, phenyl, alkyl substituted phenyl of the general formula $(R_3)_a$Ph-wherein Ph is phenyl, $R_3$ is an alkyl group having from 1 to about 18 carbon atoms and a is an integer of from 1 to 3, and phenyl-alkyl groups wherein the alkyl groups have from 1 to about 18 carbon atoms and the phenyl-alkyl groups have a total of from about 8 to about 28 carbon atoms, $R_2$ is a substituted ethylene group of the formula $-CH_2CH_2R_4$ wherein $R_4$ is selected from hydrogen, methyl, ethyl or mixtures thereof, n is a number from 0 to about 40 provided that when $R_1$ is phenyl or alkyl substituted phenyl n is at least 1 and X is any compatible cation.

19. The composition of claim 11 which includes one or more components selected from the group of latex stabilizers, dispersing agents, defoaming agents, foaming agents, emulsion breakers, fillers and rubber vulcanizing agents.

20. A method of sealing a subterranean zone to prevent the uncontrolled flow of fluids into or from the zone comprising the steps of:

preparing a subterranean zone sealing composition consisting essentially of water, an aqueous rubber latex, an organophillic clay and sodium carbonate; and introducing said sealing composition into said zone.

21. The method of claim 20 wherein said aqueous rubber latex in said sealing composition is an aqueous styrene/butadiene latex present in an amount in the range of from about 33% to about 67% by weight of said composition.

22. The method of claim 20 wherein said sealing composition includes a latex stabilizer selected from the group consisting of nonylphenol ethoxylated with in the range of from about 15 to about 40 moles of ethylene oxide and the sodium salt of a sulfonated and ethoxylated compound having the formula $H(CH_2)_{12-15}(CH_2CH_2O)_{15}SO_3Na$ present in an amount in the range of from about 0% to about 10% by weight of said composition.

23. The method of claim 20 wherein said organophillic clay in said sealing composition is an alkyl quaternary ammonium bentonite clay present in an amount in the range of from about 13% to about 22% by weight of said composition.

24. The method of claim 20 wherein said sealing composition includes a dispersing agent comprised of the condensation reaction product of acetone, formaldehyde and sodium sulfite present in an amount in the range of from about 0.35% to about 0.55% by weight of said composition.

25. The method of claim 20 wherein said sealing composition includes a welan gum biopolymer present in an amount in the range of from about 0.1% to about 0.2% by weight of said composition.

26. The method of claim 20 wherein said sodium carbonate in said sealing composition is present in an amount in the range of from about 2.7% to about 4.4% by weight of said composition, and said composition further comprises a polydimethylsiloxane defoaming agent present in an amount in the range of from about 0.4% to about 1.8% by weight of said composition.

27. The method of claim 20 wherein the composition includes one or more components selected from the group of latex stabilizers, dispersing agents, polymers, biopolymers, defoaming agents, foaming agents, emulsion breakers, fillers and rubber vulcanizing agents.

* * * * *